(12) United States Patent
Nelson

(10) Patent No.: US 6,990,182 B2
(45) Date of Patent: Jan. 24, 2006

(54) PREPAID PHONE SERVICE FOR BOTH WIRED AND WIRELESS TELECOMMUNICATION DEVICES

(75) Inventor: Roderick Nelson, Fall City, WA (US)

(73) Assignee: AT&T Wireless Services, Inc., Redmond, WA (US)

( * ) Notice: Subject to any disclaimer, the term of this patent is extended or adjusted under 35 U.S.C. 154(b) by 0 days.

(21) Appl. No.: 10/322,218

(22) Filed: Dec. 17, 2002

(65) Prior Publication Data

US 2003/0086548 A1      May 8, 2003

Related U.S. Application Data

(63) Continuation of application No. 09/742,924, filed on Dec. 21, 2000, now Pat. No. 6,529,593.

(51) Int. Cl.
*H04M 15/00* (2006.01)
*H04M 17/00* (2006.01)

(52) U.S. Cl. .................. 379/114.2; 379/115.01; 379/121.03; 379/144.06; 455/406

(58) Field of Classification Search .......... 379/114.01, 379/114.16, 114.17, 114.25, 114.26, 115.01, 379/121.01, 121.03, 130, 144.01, 144.06; 455/406

See application file for complete search history.

(56) References Cited

U.S. PATENT DOCUMENTS

| | | | |
|---|---|---|---|
| 5,265,155 A | 11/1993 | Castro | |
| 5,359,642 A | 10/1994 | Castro | |
| 5,440,621 A | 8/1995 | Castro | |
| 5,677,945 A | 10/1997 | Mullins et al. | |
| 5,754,633 A | 5/1998 | Levy | |
| 5,909,485 A | 6/1999 | Martin et al. | |
| 5,915,226 A | 6/1999 | Martineau | |
| 5,946,380 A | 8/1999 | Cohen et al. | |
| 6,131,024 A * | 10/2000 | Boltz | 455/405 |
| 6,173,171 B1 * | 1/2001 | Plush et al. | 455/408 |
| 6,188,752 B1 | 2/2001 | Lesley | |
| 6,320,947 B1 | 11/2001 | Joyce | |
| 6,333,976 B2 | 12/2001 | Lesley | |
| 6,377,938 B1 | 4/2002 | Block et al. | |
| 6,381,315 B1 | 4/2002 | Nhaissi | |
| 6,611,684 B1 * | 8/2003 | Franks | 455/433 |

FOREIGN PATENT DOCUMENTS

| | | |
|---|---|---|
| WO | WO96/41462 | 12/1996 |
| WO | WO99/03057 | 1/1999 |

* cited by examiner

*Primary Examiner*—Binh K. Tieu
(74) *Attorney, Agent, or Firm*—Klarquist Sparkman LLP

(57) ABSTRACT

A system is provided for receiving prepayment of telecommunication services is provided. The system comprises a wireless communication network, a wireline communication network, and a pre-payment server communicating with both the wireless communication network and the wireless communication network. The prepayment server stores a monetary amount associated with the telecommunication time paid for by a subscriber. A measuring module operating on the prepayment server monitors the amount of time the subscriber uses both the wireless communication network and the wireless communication network and decreasing the monetary amount accordingly. The system enables a subscriber to make a single prepayment for telecommunication services, and the amount applies to both the subscriber's wireline or wireless telecommunications devices.

22 Claims, 5 Drawing Sheets

| | SUBSCRIBER | PREPAID TIME REMAINING | PREPAID AMOUNT LEFT | RATE-BILLING APPROVED ? | NAME ON ACCOUNT | THRESHOLD WARNING VALUE |
|---|---|---|---|---|---|---|
| 132 | WIRED #1 | 10 MIN | $5.75 | YES | JONES | 15 MIN |
| 134 | WIRELESS #1 | 14 MIN | $7.50 | NO | CHARLES | 10 MIN |
| 136 | WIRELESS #2 | 3.5 MIN | $3.00 | YES | EMILY | 7 MIN |

| SUBSCRIBER | PREPAID TIME REMAINING | PREPAID AMOUNT LEFT | RATE-BILLING APPROVED ? | NAME ON ACCOUNT | THRESHOLD WARNING VALUE |
|---|---|---|---|---|---|
| 132 — WIRED #1 | 10 MIN | $5.75 | YES | JONES | 15 MIN |
| 134 — WIRELESS #1 | 14 MIN | $7.50 | NO | CHARLES | 10 MIN |
| 136 — WIRELESS #2 | 3.5 MIN | $3.00 | YES | EMILY | 7 MIN |

| SUBSCRIBER | PREPAID TIME REMAINING | PREPAID AMOUNT LEFT | RATE-BILLING APPROVED ? | NAME ON ACCOUNT | THRESHOLD WARNING VALUE |
|---|---|---|---|---|---|
| 152 — WIRED #1 | 27.5 MIN | $16.25 | YES | JONES | 10 MIN |
| 154 — WIRELESS #1 | | | | | |
| 156 — WIRELESS #2 | | | | | |

PREPAID PHONE SERVICE FOR BOTH WIRED AND WIRELESS TELECOMMUNICATION DEVICES

CROSS REFERENCE TO RELATED APPLICATIONS

This is a continuation of U.S. patent application Ser. No. 09/742,924, filed Dec. 21, 2000 now U.S. Pat. No. 6,529,593, and is incorporated herein in its entirety.

BACKGROUND OF THE INVENTION

1. Field of the Invention

The present invention relates generally to prepaid phone service and more specifically to a system and method of providing a single prepaid account for both wireline and wireless phone service.

2. Discussion of Related Art

Many individuals use both a wireline telephone, for example a home telephone line, and a wireless telephone or other wireless device for communication. Often different entities, each having different billing strategies, provide service for wireline and wireless services. Subscribers of both kinds of services typically receive separate bills for the respective telephone usage. Further, the separate billing arrangements increase the cost of the overall telephone service for the individual.

With the increased cost of having both a wireline and wireless telephone service, many individuals and families are unable to control their spending for these services. Bad credit risks prevent some people from receiving phone service because of previous payment history. To address some of these concerns, prepaid phone systems have been proposed. For example, U.S. Pat. No. 5,909,485 to Martin et al., discloses a system in which a user can call a server that communicates with the user to identify a telephone terminal and a receive a prepayment for that terminal before the user can make calls. The '485 patent discloses individual methods of setting up a prepayment plan for either a wireline system or a wireless system. However, the '485 patent fails to teach any method or system for combining a single prepaid account for all telephone service needs. The contents of the '458 patent are incorporated herein.

Another group of patents, U.S. Pat. No. 5,265,155, U.S. Pat. No. 5,359,642 and U.S. Pat. No. 5,440,621, all invented by Castro, teach a method and system for prepayment of telecommunications connections between a first and a second device. Castro discloses a system wherein a group of registered subscribers can prepay a bulk amount of money for telecommunication connection initiated by members of the registered group. This allows the group to obtain preferred calling rates. However, none of the Castro patents discloses any way of providing a simple and easy prepaid system that serves the entire group of telecommunication devices used by many subscribers. The contents of the '155, '642 and '621 patents are incorporated herein by reference.

SUMMARY OF THE INVENTION

What is needed in the art is a system and method that enables subscribers to control and monitor the amount of money they spend on all of their telecommunications services. Users may wish to be able to control the amount of their spending by prepaying for telecommunication service on a monthly basis. Rather than having separated prepaid accounts for wired and wireless services, the present invention provides a single subscriber prepayment account associated with a plurality of subscriber telecommunication devices. This enables subscribers to control their overall spending for telecommunication services.

In order to address the deficiencies in the prior art, the present invention is proposed for enabling a user to make a single pre-payment of telecommunication services that will serve to pay for both wireline and wireless telecommunications connections. According to the first embodiment of the present invention, a system for providing prepayment of telecommunication services is provided. The system is associated with a wireless communication network and a wireline communication network and comprises an account management server communicating with both the wireless communication network and the wireline communication network, the account management server storing a value associated with the telecommunication time paid for by a subscriber, and a time-measurement module. The time-measurement module monitors the amount of time the subscriber uses both the wireless communication network and the wireline communication network and decreases the value in the subscriber account accordingly.

The system according to the first embodiment of the present invention enables a subscriber to make a single prepayment for telecommunication services. The prepaid value is applied to the wireline and/or wireless telecommunication devices. The system may be organized to enable a subscriber to have a lump value (time or dollar amount) applied to all the telecommunication devices in the account, or the subscriber may be able to allocate certain prepaid values to specific devices. In this manner, if a child has a wireless phone the parent can limit the spending on that specific wireless phone accordingly.

According to a second embodiment of the present invention, a method is proposed for providing a single pre-paid telecommunication service amount to apply to subscriber wireline and wireless telecommunication devices. The method comprises storing a prepaid value in a computer server, monitoring telecommunication time for the subscriber's wireless and wireline telecommunication devices, and decreasing the value on the computer server according to the used telecommunication time by the subscriber.

The method according to the second embodiment of the invention may further include steps to enable the subscriber to control whether the account is arranged to limit the prepaid amount on a device by device basis on a subscriber account basis. The method of the present invention has the advantages of enabling the subscriber to control both how much money is spent on telecommunication services and control, if desired, the use of telecommunication time on a device-by-device basis.

BRIEF DESCRIPTION OF THE DRAWINGS

The foregoing advantages of the present invention will be apparent from the following detailed description of several embodiments of the invention with reference to the corresponding accompanying drawings, in which:

FIG. 4a illustrates the organization of the subscriber data on a device by device basis; and FIG. 4b illustrates the organization of subscriber data on a subscriber account basis.

DETAILED DESCRIPTION OF THE INVENTION

Figure 1:
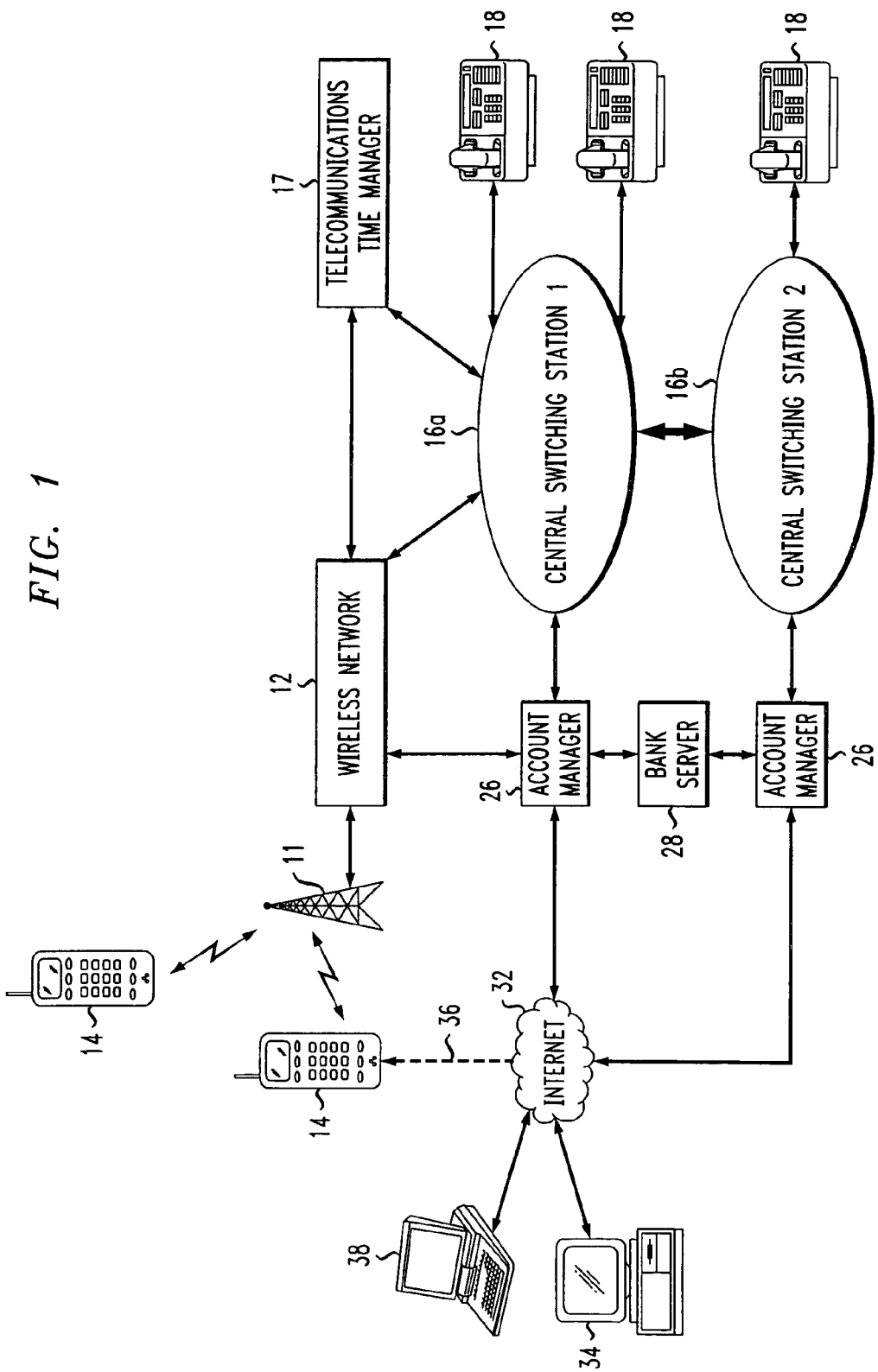
FIG. 1 is a block diagram of hardware and software for implementing the first embodiment of the invention for prepayment of telecommunication services for subscriber wireless and wireline accounts.

The first embodiment of the invention is described with reference to FIG. 1. The overall system 10 comprises a wireless or mobile telephone network 12 and an exemplary base station 11 that communicate with a plurality of mobile units 14. The mobile units 14, or wireless units, may be wireless phones, pagers, personal data devices such as palm pilots®, Internet-capable phones, mobile computers and the like. Wireless phones according to the present invention may be digital, analog, TDMA, CDMA, GSM, EDGE, or GPRS or any other protocol for wireless communicating. In other words, the present invention is not limited to any specific industry standard or device. A switched telephone network central switching station 16a communicates over a wire line with at least one telephone 18. The telephone 18 refers to any type of telephone that is different from a cellular based telecommunications device as is shown in association with the mobile network 12. Thus, telephone 18 may be a cordless phone or a wireless phone that is associated with a personal base station. A truck line 15 communicate calls from the central switching station 16a to a central switching station 16b serving another area code.

The mobile phone network 12 communicates calls to and from the switched-network 16a according to means known to those of skill in the art. Each of the mobile phone network 12 and the switched telephone network 16a communicates with an account management server 26. The account management server 26 stores information regarding the prepayment of telecommunication services for an individual subscriber. Thus each individual subscriber has a prepaid account that is associated with both his or her wireless device 14 and the wireline telephone 18. The account management server 26 manages the subscriber accounts and associated phone numbers with the wireline and wireless accounts. A bank server 28 communicates with the account management server 26 to enable a user to transfer funds from a credit card or other account to the account management server 26 in order to prepay for the telecommunication service. Those of skill in the art will understand how to provide prepayment by electronic funds transfer, bank card or check. For example, U.S. Pat. No. 5,909,485 to Martin et al., whose contents are incorporated herein by reference, illustrate several means for prepaying for service.

The account management server 26 communicates with the Internet 32 in order to enable a subscriber to enter an Internet web page associated with the prepayment system and method of the present invention and monitor his or her account status. In this manner, via a computer 34, wireless device 36 and/or a portable computing device 38, the subscriber may add further prepayment amounts to the account to purchase additional telecommunications time.

Although the above illustration and description of the first embodiment of the invention discusses a subscriber having a wireline phone and a wireless phone, another aspect of the present invention may enable a subscriber to add any number of telephone numbers or devices to a prepayment account. For example, many subscribers have two home phone numbers, and a wireless phone for each of a husband and wife, and perhaps more for children. Broadband services, cable services, or other communication or multimedia services may also be integrated into the prepayment concept according to the present invention. Thus, the present invention is flexible in that all of these phone numbers and various communication means may be paid for on the same prepayment account.

According to another aspect of the present invention, while a single prepayment account may be provided for a plurality of wireline and wireless phones, a subscriber may be able to allocate various amounts of time for each device. For example, if a family has a children's wireless phone and a family home/wireline phone, the parents may be able to enter the subscriber website through a computer 34 and limit the amount of money (or time) that can be spent using the children's wireless phone to, for example, $30 per month.

The wireless devices according to the embodiments of the present invention may be of any type or protocol. For example, TDMA, CDMA, EDGE, GPRS and/or GSM wireless networks may provide for this prepaid option. In a GSM based-wireless telephone network, U.S. Pat. No. 5,915,226 to Martineau, which contents are incorporated fully herein, illustrates a prepayment smart card for use in a GSM system. While Martineau discloses and focuses his invention on a cellular telephone system which may be used completely anonymously, the present invention will require the network to monitor and to bill the prepaid account of the subscriber. Further network elements needed for a prepaid system as disclosed herein wherein the wireless device uses a SIM card as in the GSM system includes an intelligent networking infrastructure with a billing capability to keep track of on-line tax and rate information. The user remains attached to the respective SIM card and is considered as a subscriber and managed as a subscriber.

With further reference to FIG. 1, a portion of a public telecommunication switching network (PTSN) is schematically represented. Only the central switching stations and associated billing systems for a first area code "I" and a second area code "II" are shown, as well as a single wireless system. As illustrated, central switching station I 16a for area code I is in communication with central switching station 16b for area code II by way of trunk-line circuit 15, as is known in the art. Each central switching station is connected to subscriber telecommunication devices 18 that has been assigned a unique calling number by its central switching station. Telecommunication devices 18 may be telephones, facsimile machines or other data-communication devices that can be connected within the telecommunication switching network. Other network requirements for other broadband, cable, or personal base station networks are not shown. These elements are known to those of skill in the art.

A wireless network 12 communicates calls to and from at least one wireless device 14 through at least one base station 11 to the central switching station I 16a. In order to process the cost and charges for each connection across the switching network and account for these charges over time for subscriber billing, an account manager system 26 is operably connected to the central switching station I 16a as well as the wireless network 12. The account management server 26 is capable of handling the account monitoring and processing for both local, long distance, and wireless calls in the overall network. Utility fees owing to other central switching stations for use of their lines and equipment during long-distance calls are accounted for and may be deducted from the pre-paid account.

A telecommunications time manager 17 is operably connected to both the wireless network 12 and the central switched station I 16a. The time manager 17 monitors the time during which calls are made from any telecommunication device associated with a subscriber's account. The telecommunication time manager 17 will then communicate with the account management server 26 to modify or process the telecommunication data stored in the account management server 26 to reflect decrements in pre-purchased telecommunication-time during the course of a telecommunication connection. The function of the time manager 17 may be carried out in a number of ways, such as using a data processing device, a count-down timer or the like.

In order to warn the user that the available pre-purchased telecommunication time has been reduced to a predetermined level, an alarm may be provided from the account manager 26. The alarm informs a subscriber that a certain X amount of minutes remains on the account or that a certain amount of money remains in the account. Also, the telecommunication time manager 17 includes signal-generating circuit capable of selectively generating a telecommunication-disconnect signal or rate re-enabled signal. This circuit, operably connected to the central switching station I 16a, presents the user with the choice of continuing an ongoing telecommunication process subject to rate-based cost computing when pre-purchased telecommunication time is completely exhausted. For example, using a keypad data entry device on either a wireline phone 18 or a wireless device 14, the user can program or inform the central switching station I 16a (i.e. its control program) to cause the signal generating circuit to generate and transmit a rate re-enable signal pattern.

This signal, when received at the central switching station and billing system, will re-enable the use of rate schedules and automatically generate a second transaction record for that portion of the telecommunication process extending beyond prepayment servicing. The second transaction record will be subject to rate-based cost computation, while the first transaction record for the first portion of the telecommunication process has been subject to prepayment servicing according to the present invention.

Alternatively, instead of such split transaction records, the user can program the system controller to automatically cause signal generating circuit 71 to generate a telecommunication disconnect signal pattern which is transmitted to the central switching station upon depletion of pre-purchased telecommunication-time. When received, this signal will be decoded as authorization to terminate the telecommunication connection.

The choices of handling exhausted prepaid account may be modified for each subscriber account. For example, a child's wireless phone may be prevented from purchasing additional time when the prepaid amount is exhausted. These options are stored as parameters associated with each account and the account management server 26 operates accordingly.

Figure 2:
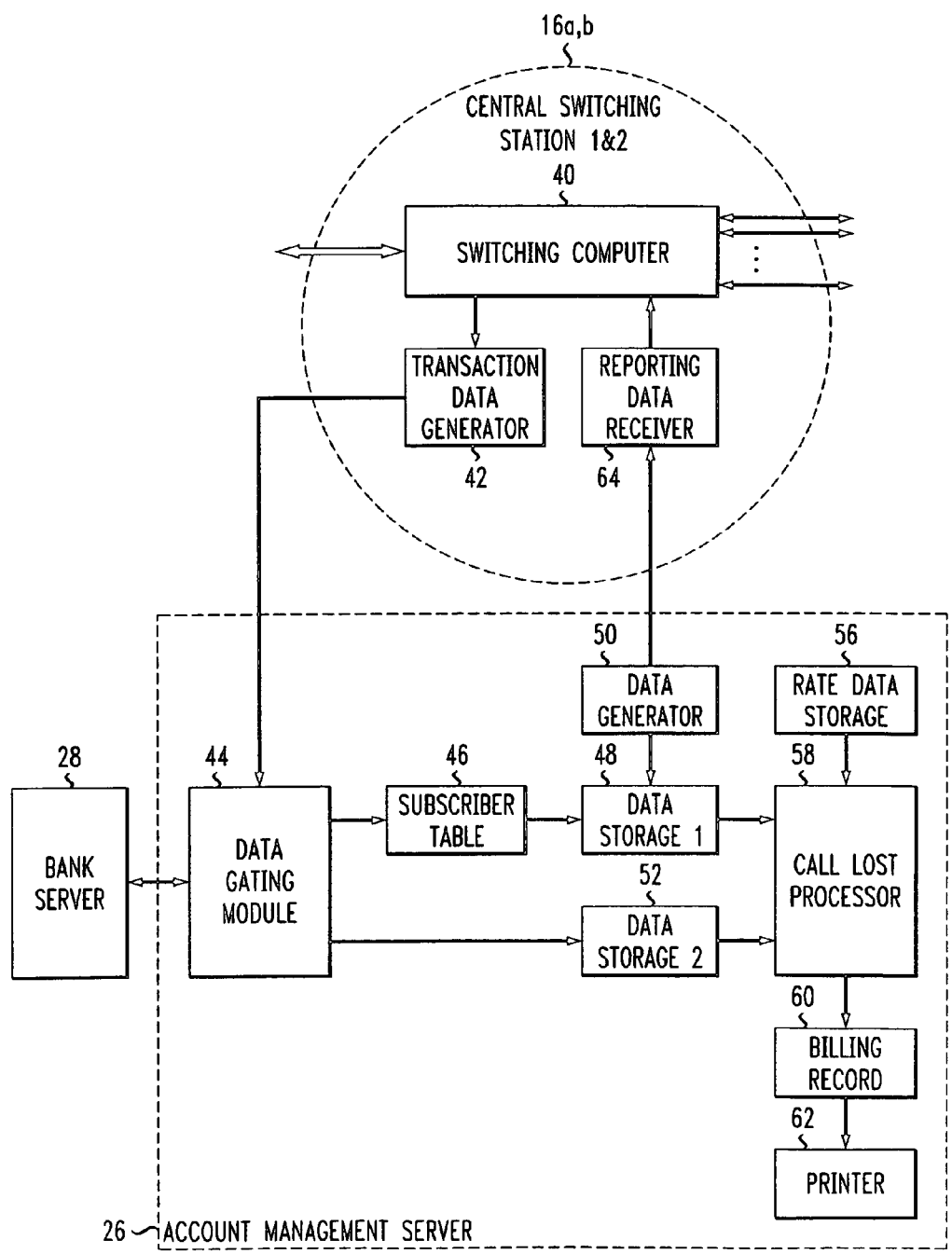
FIG. 2 is a detailed diagram of the central switching center and the account manager.

As illustrated in FIG. 2, the central switching center 16a,b comprises a switching computer 40 communicating with a transaction data generator 42 and a reporting data receiver 64. Data lines in FIG. 2 illustrate communication between other central switching centers, wireless networks, or subscriber lines. The transaction data generator 42 and reporting data receiver 64 each communicate with the account manager 26. The account manager 26 comprises data storage I 48 and data storage II 52, a data gating module 44, rate-data storage 56, a call cost processor 58, a billing record module 60 and a printer 62. The data gating module 44 communicates with the bank server 28 for receiving electronic transfers of funds for prepayment or other accounts. Data storage I and data storage II can be any memory device which stores transaction data records produced from central switching station 16a for each telecommunication connection effectuated (i.e. process conducted). While illustrated as separate units, the data storage units I, II can be realized in a single data storage device, whose storage space is ramified into two distinct subspaces.

Transaction-record data produced for each prepaid telecommunication connection is stored in data storage I 48. Such data storage can be achieved by providing gating module 44 data to a subscriber table module 46. In this module 46, a subscriber's various telecommunication numbers are organized such that the cost for a call from, for example, the subscriber's wireless device 14 is debited from the appropriate subscriber data account in data storage I 48. Transaction-record data produced for each non-prepaid telecommunication connection is stored in data storage II 52 for subsequent cost computation. Both types of transaction record data can be organized in a variety of ways, for example, according to (i) the number of each telecommunication line allocated by the central switching station, or (ii) an assigned number to each prepaid subscriber, including a number associated with each respective telecommunications device.

Rate-data from rate-data storage unit 56 and transaction record data from data storage II 52 are both provided to cost processor 58 for computing the cost for each call transaction, as shown. In general, cost processor 58 can be any suitably programmed device, such as a general purpose computing system with appropriate software for cost computation. Typically, the rate-data is a function of the time, day and duration of the call, and thus such information from each transaction record will be used to select the applicable cost rate from rate-date storage module 56. If a call transaction or monthly statement includes both prepaid portions and rate-billed portions (i.e., the subscriber's account allows for rate billing when the prepaid amount is exhausted), then the call cost processor 58 draws data from both the data storage II 52 and the data storage I 48 to process and print a billing statement.

For each transaction record provided to the cost processor, a billing record is generated and stored in billing record storage unit 60. Preferably, billing record data is organized according to a subscriber name or number including numbers associated with each additional telecommunications device associated with that subscriber. In this way, a complete monthly billing record can be readily generated for each prepaid subscriber that may be further broken down according to each telecommunication device on the account if desired. A printer 62 enables the system to print the invoices or notices of remaining pre-paid amounts for mailing to customers in a conventional fashion.

The subscriber may gain access to data within the account manager 26 via the Internet 32. In this manner, the subscriber may review and modify the pre-payment amounts in his or her account. For example, the subscriber may be able to effect an electronic transfer from a bank server 28 to the subscriber's account to add more time on the account. The account manager data 26 may further be accessed via the Internet 32 using an Internet related wireless device 14 through a wireless interface 36, palm pilot® or the like 38 or a computer 34. Also via the Internet 32, the subscriber may be able to modify the options associated with the account. The options may include, but are not limited to: (1) single prepayment amount or individual prepaid amounts for each telecommunication device in the account; (2) rate-billing after exhaustion or prepaid amount, either on an account basis or on a device-by-device basis; (3) modifying the amounts of prepaid time on a device by device basis; and (4) modifying the thresholds for low time remaining warnings.

If the prepaid amount of money or time left on the system is low, below a predetermined threshold, a data generator 50 will indicate the status of the account to a reported data receiver 64 that will inform the switching computer 40. The switching computer 40 then notifies the device with a warning such as "You have only X minutes remaining on your prepaid account." This warning message may vary based on the organization of the account (variations of which are described below in connection with FIGS. 4a and 4b). For example, if an account is organized as described for FIG. 4a, the warning may be for a child's cell-phone and may be: "Nancy, you only have 10 minutes left on your account."

Figure 3A:
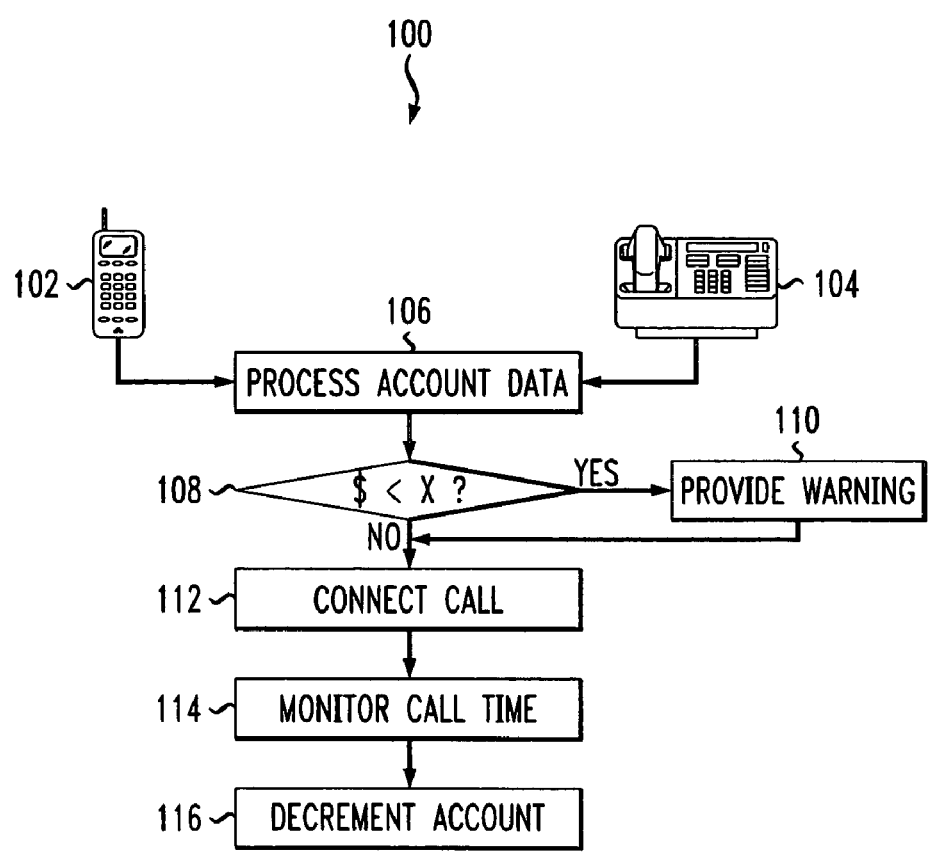
FIG. 3a is a flowchart illustrating the steps according to the second embodiment of the present invention.

FIG. 3a illustrates a second embodiment of the present invention comprising a method of enabling a subscriber to have a single pre-paid account for all of his or her telecommunication devices. FIG. 3a illustrates the example of when a subscriber has a single wired telephone 104 and a wireless device 102. However, any combination of telecommunication devices may be associated with a single subscriber or subscriber family, which association in the same subscriber account is monitored by the subscriber table 46 within the account manager 26. According to the method of the present invention, data associated with either a call from a wireless device 102 or a wired device 104 is processed according to the subscriber's single pre-paid account 106. The process determines whether the funds or time in the account is less than a predetermined number "X". For example, if the account is monitored according to the money left, say X=$10, then the routine determines whether there is less than $10 left in the prepaid account 108. If yes, then a warning is provided 110 to the subscriber regarding how much money is left on the account, and the call is connected 112. If there is no money left in the account, then the call may not be connected. If the answer is no (there is more than $10 in the account), than routine connects the call 112 and monitors the time associated with the call 114. The routine decrements the prepaid account accordingly 116.

If the pre-paid account is monitored according to the time left in the account, then step 108 inquires whether the amount of time is less than, say, 10 minutes. If so, then the routine warns the user at 10 minutes left 110 and connects the call or maintains the call. If there is more than the minimum X number of minutes, than the call is connected and the amount of time the call takes is monitored 114. The prepaid account is decremented according to the time spent on the particular call.

Figure 3B:
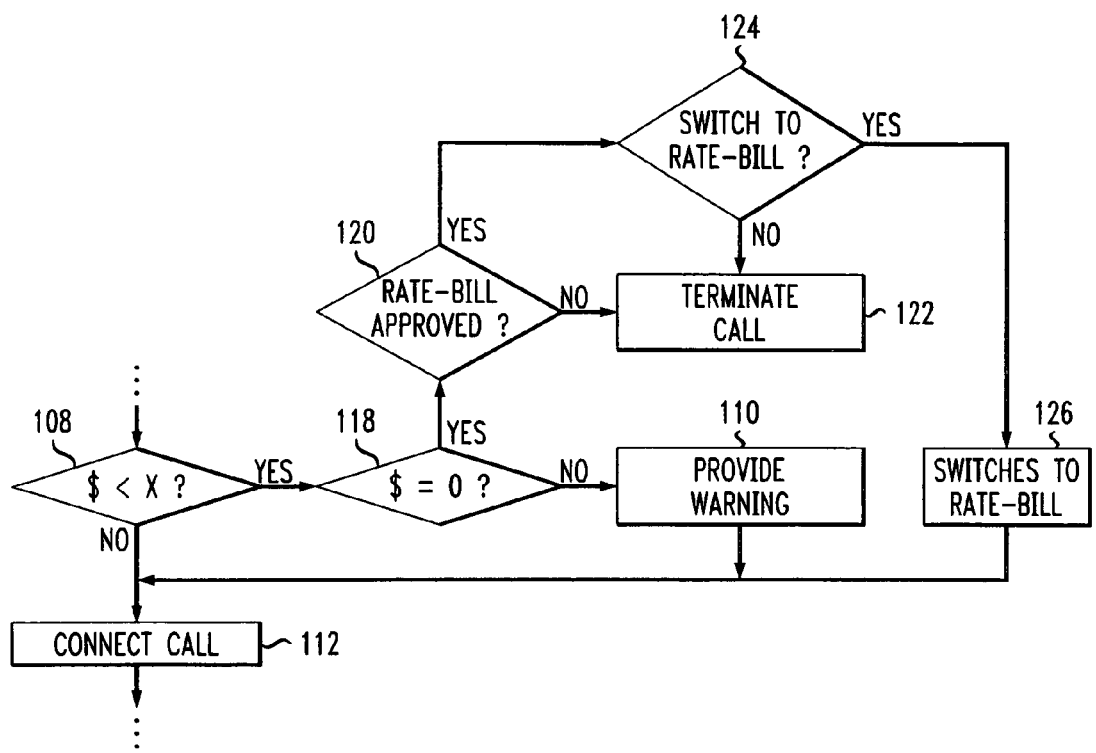
FIG. 3b is a flowchart illustration additional steps according to an aspect of the second embodiment of the present invention.

FIG. 3b illustrates further steps between steps 108 and 110 of FIG. 3a. In FIG. 3b, if the answer to the query of whether the amount of time left in the account is less than a certain threshold 108 is yes, the routine determines whether the amount is zero 118. If yes, then the routine determines whether approval on the account, for that device, enables rate-billing 120. If yes, rate-billing is enabled, a further optional question provided to the subscriber is whether they wish to continue the call or whether switching to rate-billing is authorized 124. If no, the routine terminates the call or service 122. If yes, then the system switches to rate billing 126 and the call proceeds 112. If rate billing is not approved for the account or for the individual telecommunications device 120, then the routine terminates the call 112. If at step 118, the value or amount left in the account is not zero, then the routine warns the user 110 and connects the call 112.

FIGS. 4a and 4b illustrate examples of how the subscriber data may be organized. In FIG. 4a, the data is organized in a table 130 such that a subscriber's phone numbers 132, 134, 136 each have a separate prepaid amount associated with it. In this manner, a subscriber may make a single payment but allocate different amounts to different phones as desired. Parents may be able to control the amount of calls children can make on the family phone or their own wireless phones. Each amount of prepaid time remaining has an associated amount of money left such that the "value" reported to the subscriber may be either how much money is left for the account or how much time remains for the use of the respective telecommunications device. Also associated with each phone number or telecommunications device 132, 134, 136 is whether rate-billed approval is authorized. In the example shown in FIG. 4a, the authorization is provided in a device-by-device basis, although this may be modified to be on a subscriber account basis. Further data may also be provided, such as the name of each person who will be using a particular cell phone and threshold warning values. Thus, warnings and other data provided to each user of the subscriber account may be personalized to that user.

FIG. 4b illustrates a table 150 wherein a subscriber has a first wired phone number 152, and a first wireless phone number 154 and a second wireless phone number 156. A prepaid amount column includes a single pool of money in the account from which each telecommunications device assigned to the subscriber draws from as they are used. The parameters for authorization for rate-billing, name on the account, and threshold warning amount are also illustrated in FIG. 4b on an subscriber account basis.

Although the above description may contain specific details, they should not be construed as limiting the claims in any way. Other configurations of the described embodiments of the invention are part of the scope of this invention. For example, although many details are provided in FIG. 2, the concepts and spirit of the invention are not meant to be limited to that particular system organization. As wireline and wireless network improve and change, such modifications are contemplated as within the scope of the present invention. Accordingly, the appended claims and their legal equivalents should only define the invention, rather than any specific examples given.

I claim:

1. A system for making pre-payments of communication services for utilizing both wireline and wireless communications networks, the system compnsing:
   a wireless communication network;
   a wireline communication network;
   an account management server communicating with both the wireline communication network and the wireless communication network, the account management server storing a value associated with a subscriber's prepaid account;
   a subscriber data structure maintains a record of a plurality of communication devices associated with the subscriber's prepaid account, wherein for at least one of the plurality of communication devices, the record further comprises a limiting data field associated with a communication device wherein the limiting data field indicates a limit on communication network utilization for its associated communication device; and a measuring module, the measuring module monitoring network utilization in order to determine whether a communication device has exceeded its associated limiting data field.

2. The system according to claim 1, wherein the at least one of the subscriber's associated communication devices is a wireless communication device.

3. The system according to claim 1, wherein the at least one of the subscriber's associated communication devices is a wireline communication device.

4. The system according to claim 1, wherein the account manager server provides a warning when the limiting data field drops below a predetermined level.

5. The system according to claim 1, wherein a subscriber may access and modify limiting data fields associated with a subscriber's associated communication devices.

6. A method for providing a single prepaid subscriber account for plural communication devices including at least one wired communication device and at least one wireless communication device, the method comprising:
    receiving a prepaid value associated with the prepaid subscriber account;
    maintaining a data structure associating a single prepaid subscriber with plural communication devices wherein at least one of the plural communication devices is a network access limited communication device as indicated by a corresponding access limiting data field comprising a portion of the prepaid value associated with the prepaid subscriber account; and
    monitoring network utilization and determining whether network access limited communication devices have exceeded resources indicated by corresponding access limiting data fields.

7. The method of claim 6, further comprising terminating network access for a network access limited communication device when a corresponding access limiting data field is exceeded.

8. The method of claim 7, further comprising warning the subscriber when an access limiting data field is below a predetermined threshold value.

9. The method of claim 8, further comprising if a network access limited communications device exceeds its corresponding access limiting data field, switching telecommunication billing to rate-billing for the communications device if approved on the subscriber account.

10. The method of claim 9, further comprising providing a billing statement reflecting both prepaid value time used and rate-billing time used for communications devices of a single prepaid subscriber account.

11. The method of claim 9, further comprising providing an authorized user via a computer interface access to the single prepaid subscriber's account to set network access limitations for communication devices.

12. The method of claim 11, wherein a parent is an authorized user, time is a network access limitation, and a wireless telephone in possession of a child is the communication device.

13. The method of claim 6, wherein both wired communication devices and wireless communication devices are network access limited communication devices.

14. The method of claim 6, wherein a communication device communicates via an internet connection.

15. The method of claim 14, wherein the internet connection is wireless.

16. The method of claim 6, wherein a communication device is identified based on a SIM card identifier and monitored network utilization is determined based on any communication device transmitting the SIM card identifier.

17. The method of claim 6, further comprising providing an authorized user of the prepaid subscriber's account access for modifying options associated with the account.

18. A computer readable medium having stored thereon, computer-executable instructions for providing a prepaid subscriber account for plural communication devices including at least one wired communication device and at least one wireless communication device, the instructions comprising:
    instructions for receiving a prepaid value associated with the prepaid subscriber account;
    instructions for maintaining a data structure associating a single prepaid subscriber with plural communication devices wherein at least one of the plural communication devices is a network access limited communication device as indicated in the data structure by a corresponding access limiting data field comprising a portion of the prepaid value associated with the prepaid subscriber account; and
    instructions for monitoring network utilization and determining whether network access limited communication devices have exceeded resources indicated by corresponding access limiting data fields.

19. The computer readable medium of claim 18, wherein the computer-executable instructions further comprise instructions for terminating network access for a communication device when the portion of the prepaid value is exceeded.

20. The computer readable medium of claim 19, wherein the computer-executable instructions further comprise instructions for warning the subscriber when a portion of the prepaid value for a respective communications device is below a predetermined threshold.

21. The computer readable medium of claim 20, wherein the computer-executable instructions further comprise providing an authorized user via a computer interface access to the single prepaid subscriber's account information to set a network access limitation for a communication device.

22. The computer readable medium of claim 19, wherein the computer-executable instructions further comprise instructions for indicating that both wired communication devices and wireless communication devices are network access limited communication devices.

* * * * *